(12) United States Patent
Alcorn

(10) Patent No.: US 6,298,475 B1
(45) Date of Patent: Oct. 2, 2001

(54) METHOD AND APPARATUS FOR ANALYZING PERFORMANCE OF A JAVA BEAN

(75) Inventor: John William Alcorn, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,514

(22) Filed: Dec. 3, 1998

(51) Int. Cl.⁷ .................................................. G06F 9/45
(52) U.S. Cl. .................................................. 717/4
(58) Field of Search .................................................. 717/4

(56) References Cited

U.S. PATENT DOCUMENTS

| | | | |
|---|---|---|---|
| 5,933,144 | * | 8/1999 | Alcorn ................................. 709/328 |
| 5,953,526 | * | 9/1999 | Day et al. ................................. 717/1 |
| 6,061,721 | * | 5/2000 | Ismael et al. ......................... 709/223 |
| 6,151,700 | * | 11/2000 | Fox ......................................... 717/3 |

OTHER PUBLICATIONS

IBM, Bean Extender General Information, IBM Homepage, All, Dec. 1997.*

Fox, Using BeanExtender's Dipping Technique, IBM's Homepage, p. 1–13, Dec. 1997.*

Davis, M., Adaptable Reusable Code, Jan. 1995, ACM, p. 38–46.*

Heineman, G., Adaptation and Software Architecture, Mar. 1998, ACM, p. 61–64.*

Heineman, G., A Model for Designing Adaptable Software Components, 1998, IEEE, p. 121–127.*

* cited by examiner

Primary Examiner—Mark R. Powell
Assistant Examiner—John Q. Chavis
(74) Attorney, Agent, or Firm—Duke W. Yee; David A. Mims, Jr.

(57) ABSTRACT

A method and apparatus in a data processing system for analyzing an object. The object is morphed, wherein the program becomes a dippable object. A dip is created for the dippable object, wherein the dip identifies time spent executing method calls, event firings, and property changes in the object. The dip is added to the dippable object, wherein the dippable object may be analyzed.

23 Claims, 4 Drawing Sheets

METHOD AND APPARATUS FOR ANALYZING PERFORMANCE OF A JAVA BEAN

BACKGROUND OF THE INVENTION

1. Technical Field

The present invention relates generally to an improved data processing system and in particular to an improved method and apparatus for analyzing execution of code in a data processing system. Still more particularly, the present invention relates to a method and apparatus for analyzing performance of a Javabean.

2. Description of Related Art

Object-oriented programming techniques involve the definition, creation, use, and instruction of "objects". These objects are software entities comprising data elements or attributes and methods, which manipulate data elements. Objects also may include data related to events outside of the object to trigger or control methods within the object.

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods.

The Java virtual machine (JVM) is a virtual computer component that resides in memory. In some cases, the JVM may be implemented in a processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures.

To enable a Java application to execute on different types of data processing systems, a compiler typically generates an architecture-neutral file format—the compiled code is executable on many processors, given the presence of the Java run-time system. The Java compiler generates bytecode instructions that are non-specific to a particular computer architecture. These bytecodes are executed by a Java interpreter. A Java interpreter is a module in the JVM that alternately decodes and executes a bytecode or bytecodes.

A Java bean is a reusable component. Various programs in Java may be created by aggregating different Java beans. An applet is an example of a type of program that may be created using Java beans. Applets are programs that are deployed on the Internet or on an Intranet, which are executed by a browser in conjunction with various pages or documents sent to a browser, which is a program used to access documents, such as HTML web pages. It is desirable to optimize the performance of various programs including applets. Currently, a standard means for determining the performance of a given Java bean is unavailable. Presently, the source code for each bean must be modified. This need to modify the bean requires access to the source code for each bean that is to be analyzed.

Therefore, it would be advantageous to have an approved method and apparatus to determine the performance of a Java bean without requiring modification of the bean or access to the source code for the bean.

SUMMARY OF THE INVENTION

The present invention provides a method and apparatus in a data processing system for analyzing an object. The object is morphed, wherein the object becomes a dippable object. A dip is created for the dippable object, wherein the dip identifies time spent executing the object. The dip is added to the dippable object, wherein the dippable object may be analyzed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
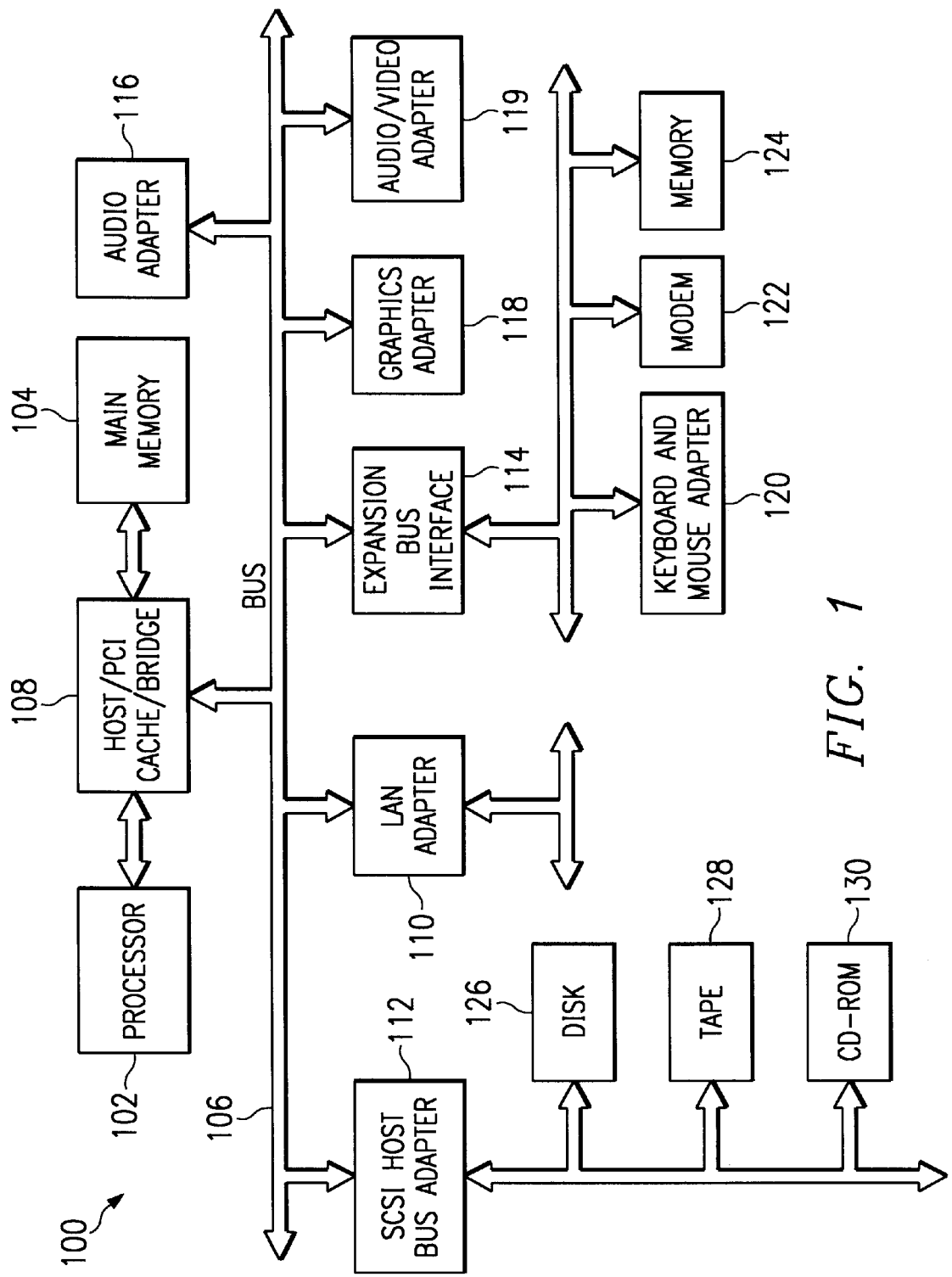
FIG. 1 is a block diagram of a data processing system in which the present invention may be implemented.

With reference now to the figures and in particular with reference to FIG. 1, a block diagram of a data processing system 100 in which the present invention may be implemented is illustrated. Data processing system 100 may be used either as a server or a stand-alone computer. Data processing system 100 employs a peripheral component interconnect (PCI) local bus architecture. Although the depicted example employs a PCI bus, other bus architectures such as Micro Channel and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, Small Computer System Interface (SCSI) host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 100. Instructions for the operating system, the object-oriented programming system, and applications or programs may be located on storage devices, such as hard disk drive 126 and may be loaded into main memory 104 for execution by processor 102.

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. The depicted example is not meant to imply architectural limitations with respect to the present invention. For example, the processes of the present invention may be applied to a multiprocessor data processing system.

The present invention provides a method, data processing system, and instructions for analyzing the performance of a Java bean. The present invention provides a mechanism for determining the performance of a Java bean through the use of BeanExtender, which is a product available from International Business Machines Corporation A Java bean is made dippable such that a dip created to measure the performance of a Java bean may be attached to the dippable bean. In the depicted example, a performance dip is created in which the dip reports to a configurable output location, such as a data structure in the form of a vector performance data gathered during execution of the bean. This performance data in the depicted example measures the time spent during execution of property modification, event creation and firing, and general method invocations for the bean. The performance data may be used by developers to tune beans. The data is gathered in the depicted example by the use of a pre-listener and a post-listener for each method, property, and event in a bean for which performance information is to be gathered.

In the depicted examples, the processes of the present invention are implemented using the Java programming system, which is an object oriented programming system. Object-oriented programming techniques involve the definition, creation, use, and instruction of "objects". These objects are software entities comprising data elements or attributes and methods, which manipulate data elements. Objects also may include data related to events outside of the object to trigger or control methods within the object.

Objects are defined by defining "classes", which are not objects, but templates, which instruct a compiler how to construct the actual object. For example, a class may specify the number and type of data variables and the steps involved in the functions, which manipulate data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related methods are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and prevents the program from being run.

Polymorphism allows objects and functions which have the same overall format, but which work with different data, to function differently to produce consistent results. For example, an object may have the format of attribute data and methods to support a geometric shape. The same format can be used whether the shape is a rectangle or a circle. However, the actual program code which performs the shape formation may differ widely depending on the type of variables which comprise the shape. After the methods have been defined, a program can later refer to the shape formation method by its common format and, during compilation, the compiler will determine which of the shaping methods to be used by examining the variable types. The compiler will then substitute the proper function code.

A third property of object oriented programming is inheritance which allows program developers to reuse pre-existing programs. Inheritance allows a software developer to define classes and the object which are later created from them as related through a class hierarchy. Specifically, classes may be designated as subclasses of other basic classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

A set of predefined, interconnected classes are sometimes provided to create a set of objects and additional miscellaneous routines which are all directed to performing commonly encountered tasks in a particular environment. Such predefined classes are typically called "frameworks" and essentially provide a prefabricated structure as a basis for creating a working application program.

In object oriented programming such as the previously described Java system, a developer is provided a framework, containing a set of predefined interface objects. The framework contains predefined classes which can be used as base classes and a developer may accept and incorporate some of the objects into these base classes, or the developer may modify or override objects or combinations of objects in these base classes to extend the framework and create customized solutions in particular areas of expertise.

A clarification of the term "framework" as used in object-oriented programming is in order. Frameworks are pre-defined structures for objects, combinations of objects which form more extensive objects and eventually combinations which provide whole programs.

Frameworks are employed in which predefined, interconnected classes are organized to provide a structure that is the basis for creating a program. In Java, a framework is present that contains predefined classes used as base classes. Objects may be incorporated into these base classes or objects or combinations of objects.

Figure 2:
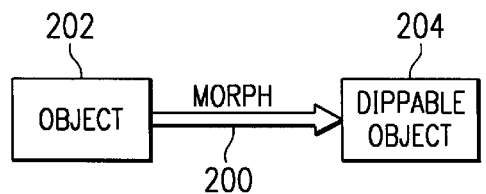
FIG. 2 is a diagram of a morphing operation in accordance with a preferred embodiment of the present invention.

With reference now to FIG. 2, a diagram of a morphing operation is depicted in accordance with a preferred embodiment of the present invention. A morphing operation is applied to object 202 to create a new dippable object 204. Dippable object 204 is object 202 with modifications that allow it to accept additional behavior in the form of a dip. A "dip" is a class that has an interface that allows the class to be used by a dippable object. In essence, dippable object 204 looks and behaves like object 202, but has the added ability to accept behavioral modification components. Object 202 may be a Java class, such as, for example, a gaming program. When the object is morphed through morphing operation 200, the object becomes a dippable object. The dippable object may have its behavior modified or have behavior added to it. Morphing results in a new class that looks and behaves like before, but has the function of accepting new behaviors in the form of dips. For example, new behavior in the form of a performance measurement tool may be added to the gaming program in accordance with a preferred embodiment of the present invention. This performance measurement tool is implemented using a dip as will be described in more detail below.

Figure 3:
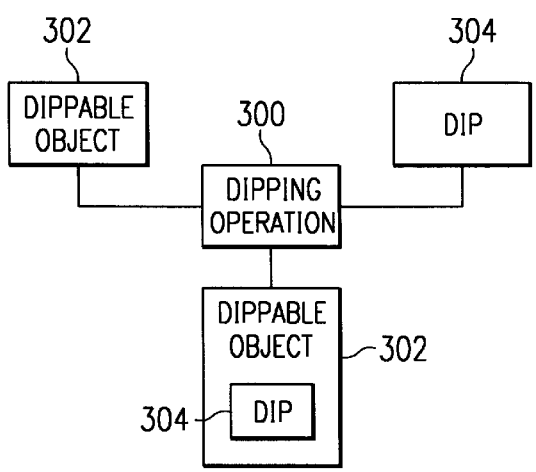
FIG. 3 is a diagram of a dipping operation in accordance with a preferred embodiment of the present invention.

Turning now for FIG. 3, a diagram of a dipping operation is depicted in accordance with a preferred embodiment of the present invention. After an object has been made dippable, behavior modifications may be made using dipping operation 300. Dipping operation 300 uses dippable object 302 and dip 304 as inputs to attach dip 304 to dippable object 302. A dip is an implementation of a dip interface (a class), which allows the class to perform two things: (1) a dip allows an instance of a class which implements the dip interface to be associated with (attached to) an instance of a dippable class, and (2) a dip allows an instance of the class which implements the dip interface, which has been associated with an instance of a dippable class, to modify the behavior of an instance of the dippable class. Dipping is the operation, which associates an instance of the dip class with an instance of a dippable class. Dip 304 encapsulates behavior that is to be added to dippable object 302. In addition, dip 304 controls dippable object 302 with respect to the added behavior. For example, with a gaming program that has been morphed to be dippable, a dip in the form of a performance measurement tool measures the time spent in selected methods, such as methods used to display graphics.

Morphing and dipping are both used to modify a program to add or modify behavior of the object. In accordance with a preferred embodiment of the present invention, these processes are employed to add performance tools to objects. In addition, added or modified behavior may be easily removed at a later time by removing the dip. If the performance tool measures execution time of a method, the dip containing this performance tool may be removed and the new dip containing a performance tool to measure execution time of another method may be added to the object. In the preferred embodiment, all methods, properties, and events are measured.

Morphing is a means by which an existing class is examined and duplicated as a subclass such that all methods, events, and properties of the original class can have "before" and "after" notifications performed. In addition, any "before" notification can also veto the execution of the method, property, or event. This mechanism is handled by applying a dip to the subclass resulting from the morphing. The dip then uses the "before" and "after" notifications to modify the behavior of the subclass and therefore the original class. The combined subclass and dip(s) are then saved as a single component. More information on morphing and dipping objects can be found in assignee's co-pending U.S. Patent Application entitled "An Object Oriented Programming System With Objects For Dynamically Connecting Functioning Programming Objects With Objects For General Purpose Operation", LeBlanc et al., Ser. No. 08/953,345, filed Oct. 17, 1997, which is incorporated herein by reference. In this application, "morphing" is described as a process for creating hooks in a connecting object which fires events to notify interested objects. Morphing is the means by which an original general purpose Bean is extended using a connecting layer to hook the original Bean's property changes, event generation, and method calls and notify any interested context layer objects (dips) to produce a dippable general purpose Bean.

To begin, one must understand dips. Dips are beans (reusable software components) that react to state changes in dippable beans to which they are attached. Dippable beans are beans that have been run through a morphing tool, in which the bean is wrapped with an API, so that dips can be applied. Dips modify the runtime behavior of the beans to which they are attached, but they do not provide new interfaces on beans to which they are attached. Dips are attached through the EventListener model. This one-way communication mechanism, while limiting, can be used to add behaviors to a dippable bean. However, if the original bean was thread safe, its dippable version remains thread safe. If the original bean was immutable, the original bean part of the dippable bean remains immutable. The original bean part is what is visible to the clients of the bean. Though dips can add behavior, they cannot add new properties, events, or methods to the bean.

The dipping framework allows the user to take an existing Java class and produce a new class to which dips can be applied. This can be done in one of the following ways: (1) take an existing class and create a new dippable class as a child of the original, parent class; or (2) take an interface and a corresponding implementation class and create a new dippable class that implements the interface and uses the implementation class.

In each case, the new dippable class implements the dippable interface. If desired, the new dippable class could implement the dippable extended interface, which is a child of the dippable interface. Therefore, all dippable classes, even those implementing the dippable extended interface, are implementations of the dippable interface.

During the creation of a new dippable class, dips can be added to the class definition of the dippable bean. Because dips can be added to an instance of a dippable bean, instances of the same class can have different behaviors applied to them through the dipping process. The dipping concept creates a step between development and deployment for Java applications. This step allows new behaviors to be added to existing binary objects.

A dippable bean allows dips to intercept properties, methods, and events. All set<PropertyName>() (1) methods are treated as property-related. All fire<EventName>() or process<EventName>()methods are treated as event-related.

The dipping framework works outside of a beans' environment and works on any Java class that follows the Java beans naming strategy.

With respect to using dips to attach performance measurement tools, a dip containing instructions for identifying the amount of time spent during the execution of various methods, property modification, and event creation and firing is attached to a bean to measure the desired performance properties for the bean.

Figure 4:
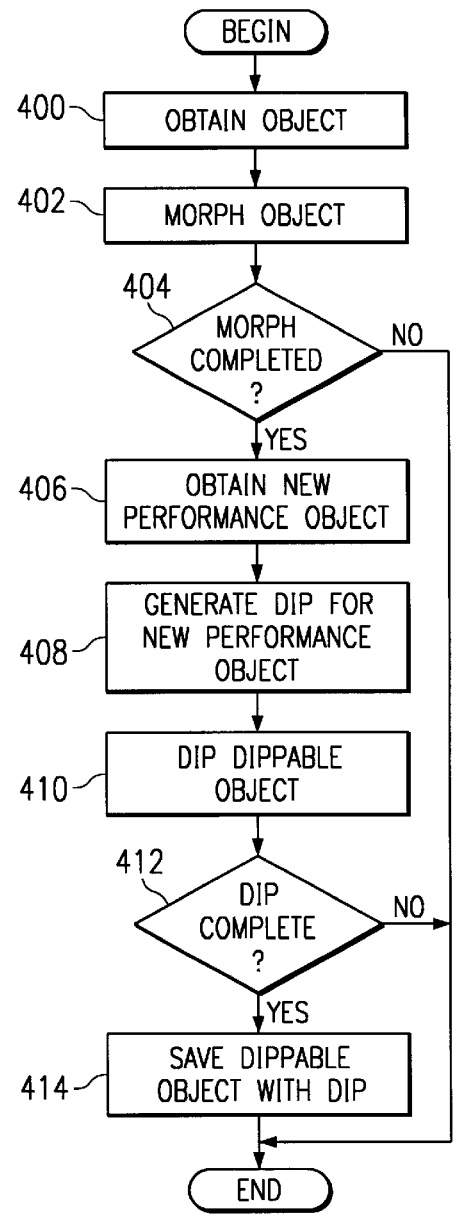
FIG. 4 is a flowchart of a process for adding performance measurement tools to an object in accordance with a preferred embodiment of the present invention.

With reference now to FIG. 4, a flowchart of a process for adding performance measurement tools to an object is depicted in accordance with a preferred embodiment of the present invention. The process in FIG. 4 is applied to create a dippable object from a Java object. The process begins by obtaining an object for which a performance tool is to be added (step 400). Next, the object is morphed (step 402). A determination is made as to whether the morphing process was successfully completed (step 404). If the process was not successful, the process terminates. If the morphing process is successful, a dippable object has been produced. Then, a performance object containing one or more desired measurement tools is obtained (step 406). A performance dip is generated for the performance object (step 408).

The dippable object is dipped (step 410) with the performance dip. Next, a determination is made as to whether the dipping process was successfully completed (step 412). If the dipping process was not successfully completed, the process terminates. Successful completion of the dipping process results in saving of the dippable object with the dip (step 414) with the process terminating thereafter.

Figure 5:
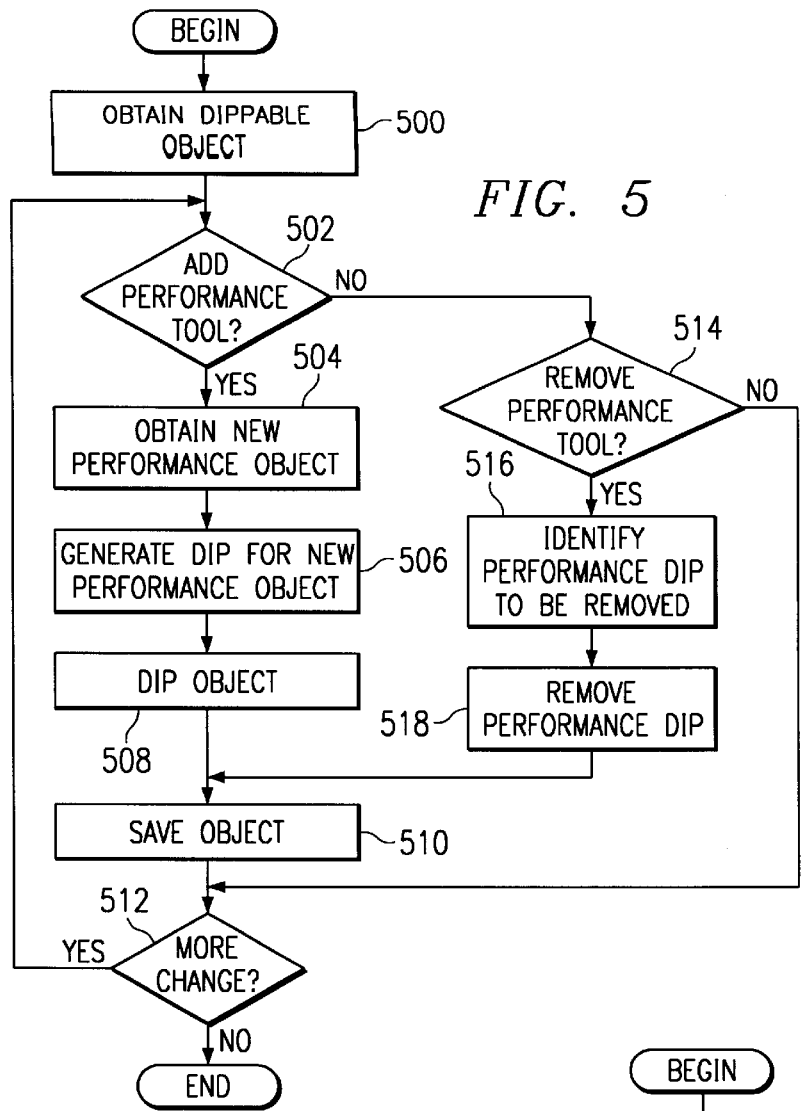
FIG. 5 is a flowchart of a process for adding and removing a performance dip from a dippable object in accordance with a preferred embodiment of the present invention.

Turning next to FIG. 5, a flowchart of a process for adding and removing a performance dip from a dippable object is depicted in accordance with a preferred embodiment of the present invention. This process may be applied to dippable objects with and without dips. The process begins by obtaining the dippable object that is to have its behavior modified (step 500). A determination is made as to whether a new performance tool is to be added to the dippable object (step 502). If a new performance tool is to be added, the new performance object is then obtained (step 504), and a dip is generated for the new performance object (step 506). Thereafter, the dippable object is dipped using the dip generated for the performance object (step 508). The modified dippable object with the new dip is then saved (step 510). A determination is then made as to whether more changes are to be made to the dippable object (step 512). If more changes are to be made, the process then returns to step 502. Otherwise the process terminates.

With reference again to step 502, if a new performance tool is not to be added, a determination is made as to whether a performance tool is to be removed (step 514). If a performance tool is to be removed, the performance dip containing the performance tool is identified (step 516). Then, the performance dip is removed (step 518) with the process then proceeding to step 510 as described above. With reference again to step 514, if a performance tool is not to be removed, the process then proceeds to step 512 as described above.

Figure 6:
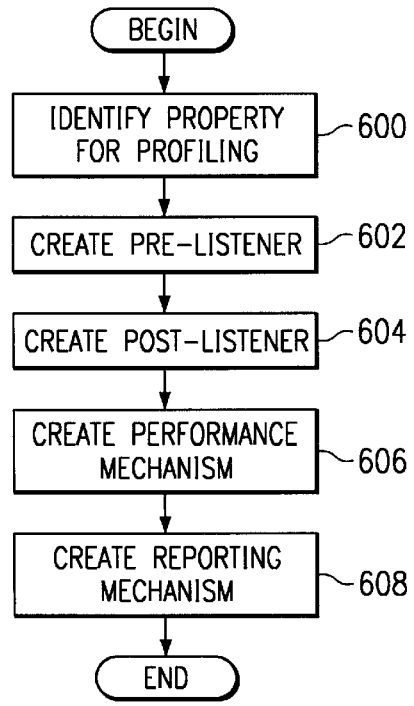
FIG. 6 is a flowchart of a process for creating a performance tool in accordance with a preferred embodiment of the present invention.

With reference now to FIG. 6, a flowchart of a process for creating a performance tool is depicted in accordance with a preferred embodiment of the present invention. The process begins by identifying a property for profiling or analysis (step 600). In the depicted example, this property may a property modification, event creation and firing, and a general method invocation. Thereafter, a pre-listener is created for the property (step 602). The pre-listener is notified when the property is about to be invoked. In the depicted example, the pre-listener determines the current time when it is notified. This current time is added along with the name of the method being invoked to a vector. Next, a post-listener is created (step 604). The post-listener is designed to receive a notification that the corresponding invocation of the property has completed. The post-listener will determine the current time and subtract this value from the value generated by the pre-listener to generate a period of time. Then a reporting mechanism is created (step 608). In the depicted example, the period of time generated by the post-listener is stored in the vector along with the name of the property.

Figures 7, 8:
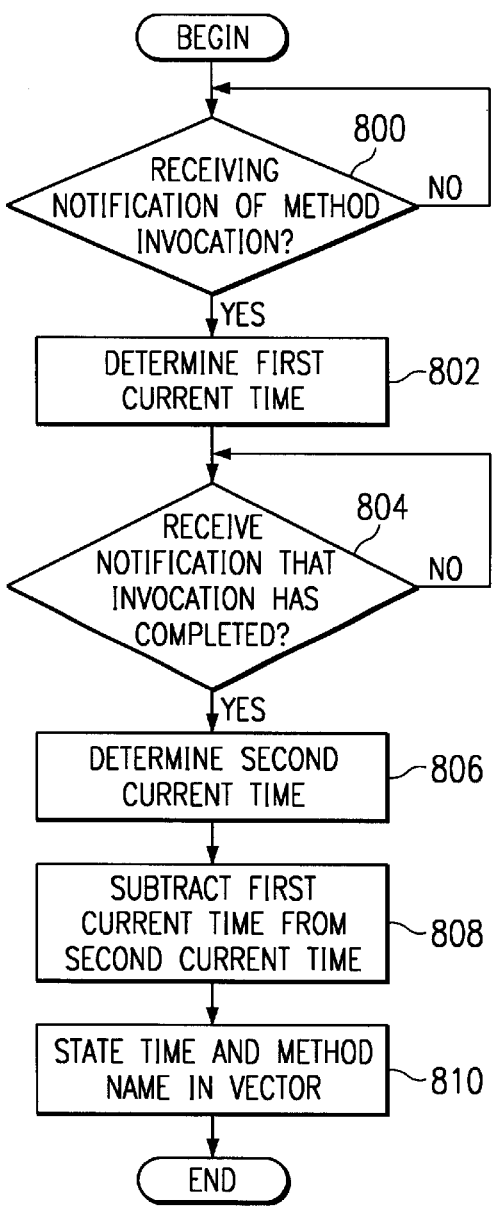
FIG. 7 is a vector in accordance with a preferred embodiment of the present invention.
FIG. 8 is a flowchart of a process followed by a performance dip in accordance with a preferred embodiment of the present invention.

Turning to FIG. 7, a vector is depicted in accordance with a preferred embodiment of the present invention. Vector 700 in this example contains elements 702–708 in which each element includes a method named 710 and a period of time 712. Vector 700 is designed to allow for an arbitrary number of elements, allowing for different amounts of data to be stored. As data is added to vector 700, more elements may be created.

Turning now to FIG. 8, a flowchart of a process followed by a performance dip is depicted in accordance with a preferred embodiment of the present invention. In this example, the performance dip measures the time spent executing a method. Other measurements may be made, such as the time spent during the execution of property modification and event creation and firing. The process begins by determining whether a notification of a method invocation has been received (step 800). If such a notification has not been received, the process returns to step 800. Otherwise, the process determines a first current time (step 802), which is stored in a vector. A determination is then made as to whether a notification that the invocation of the method has completed (step 804). If a notification that the invocation has completed is absent, the process returns to step 804. Upon receiving the notification that the invocation has completed, a second current time is determined (step 806). Then, the first current time is retrieved from the vector and subtracted from the second current time to create a period of time (step 808). This time and the method name are output to a configurable location with the process terminating thereafter. Other information also may be recorded, such as, for example, the start time of the invocation as represented by the first current time and the completion time of the invocation as indicated by the second current time.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for analyzing an object, the method comprising the data processing system implemented steps of:

morphing the object, wherein the object becomes a dippable object;

creating a dip for the dippable object, wherein the dip identifies time spent executing the object; and adding the dip to the dippable object, wherein the dippable object may be analyzed.

2. The method of claim 1, wherein the object is a Java bean.

3. The method of claim 1, wherein the object is a plurality of beans.

4. A method in a data processing system for attaching a dip to a bean, the method comprising the data processing system implemented steps of:

creating the dip, wherein the dip identifies time spent executing a bean; and attaching the dip the bean.

5. The method of claim 4, wherein the step of attaching comprises:

morphing the bean to create a dippable bean; and attaching the dip to the dippable bean.

6. The method of claim 4, wherein the dip reports time spent executing the bean to an output location.

7. The method of claim 6, wherein the dip reports time spent during property modification.

8. The method of claim 6, wherein the dip reports time spent during event creation.

9. The method of claim 6, wherein the dip reports time spent during method invocation.

10. The method of claim 6, wherein the dip includes:

a first listener, which receives a first notification that an invocation is occurring; and a second listener, which receives a second notification that the invocation has completed.

11. The method of claim 10, wherein the first listener records a time of the first notification and the second listener records the time of the second notification and further comprising:

determining a period of time between the time between the first notification and the second notification.

12. A data processing system for analyzing an object, the data processing system comprising:

morphing means for morphing the object, wherein the object becomes a dippable object;

creating means for creating a dip for the dippable object, wherein the dip identifies time spent executing the object; and adding means for adding the dip to the dippable object, wherein the dippable object may be analyzed.

13. The data processing system of claim 12, wherein the object is a Java bean.

14. The data processing system of claim 13, wherein the object is a plurality of beans.

15. A data processing system for attaching a dip to a bean, the data processing system comprising:

creating means for creating the dip, wherein the dip identifies time spent executing a bean; and attaching means for attaching the dip to the bean.

16. The data processing system of claim 15, wherein attaching means comprises:

morphing means for morphing the bean to create a dippable bean; and attaching means for attaching the dip to the dippable bean.

17. The data processing system of claim 15, wherein the dip reports time spent executing the bean to an output location.

18. The data processing system of claim 17, wherein the dip reports time spent during property modification.

19. The data processing system of claim 17, wherein the dip reports time spent during event creation.

20. The data processing system of claim 17, wherein the dip reports time spent during method invocation.

21. The data processing system of claim 17, wherein the dip includes:

a first listener, which receives a first notification that an invocation is occurring; and a second listener, which receives a second notification that the invocation has completed.

22. The data processing system of claim 21, wherein the first listener records a time of the first notification and the second listener records the time of the second notification and further comprising:

determining means for determining a period of time between the first notification and the second notification.

23. A computer program product in a data processing system for analyzing an object, the computer program product comprising:

first instructions for morphing the object, wherein the program becomes a dippable object;

second instructions for creating a dip for the dippable object, wherein the dip identifies time spent executing the object; and third instructions for adding the dip to the dippable object, wherein the dippable object may be analyzed.

* * * * *